United States Patent [19]

Kawakami et al.

[11] Patent Number: 5,408,013
[45] Date of Patent: Apr. 18, 1995

[54] UNSATURATED POLYESTER RESIN COMPOSITION AND SHEET-FORM MOLDING MATERIAL USING THE SAME

[75] Inventors: Hiroyuki Kawakami; Masaaki Yasuda; Shoichi Sasaki, all of Hitachi, Japan

[73] Assignee: Hitachi Chemical Co., Ltd., Tokyo, Japan

[21] Appl. No.: 159,959

[22] Filed: Dec. 1, 1993

Related U.S. Application Data

[63] Continuation-in-part of Ser. No. 918,289, Jul. 22, 1992, abandoned.

[30] Foreign Application Priority Data

Aug. 12, 1991 [JP] Japan .................. 3-202004
Feb. 18, 1992 [JP] Japan .................. 4-030582

[51] Int. Cl.⁶ .............................. C08F 20/00
[52] U.S. Cl. .................... 525/445; 528/272;
528/296; 528/299; 528/300; 528/301; 528/302;
528/303; 528/306; 528/308; 528/308.6; 525/33;
525/35; 525/36; 525/41; 525/437; 525/444;
525/447; 525/448; 428/480; 428/482
[58] Field of Search ............... 528/272, 296, 299, 300,
528/301, 302, 303, 306, 308, 308.6; 525/33, 35,
36, 41, 43, 437, 444, 445, 447, 448; 428/480, 482

[56] References Cited

U.S. PATENT DOCUMENTS

| | | | |
|---|---|---|---|
| 3,923,927 | 12/1975 | Miyake et al. | 525/40 |
| 4,122,132 | 10/1978 | Murata et al. | 525/69 |
| 4,837,270 | 6/1989 | Kraemer et al. | 525/27 |
| 5,075,393 | 12/1991 | Thompson | 525/444 |
| 5,077,326 | 12/1991 | Shibata et al. | 523/523 |

FOREIGN PATENT DOCUMENTS 59-122514 7/1984 Japan .
63-043948 2/1988 Japan .

*Primary Examiner*—Samuel A. Acquah
*Attorney, Agent, or Firm*—Fay, Sharpe, Beall, Fagan, Minnich & McKee

[57] ABSTRACT

An unsaturated polyester resin composition capable of affording a molded product having a small cured volume shrinkage, a superior dimensional stability, a surface quality and a high hardness, a sheet-form molding material using the composition and a process for producing a fiber-reinforced plastic molded product are provided, which composition comprises a saturated polyester obtained by reacting a saturated dibasic acid component containing 20% by mol or more of adipic acid with a saturated glycol component and having a number average molecular weight of 4,000 or higher and an acid value of 2 to 8 KOH mg/g, an unsaturated polyester and an ethylenic unsaturated monomer; which sheet-form molding material has the unsaturated resin composition together with a fiber reinforcing material placed between two films.

6 Claims, 1 Drawing Sheet

UNSATURATED POLYESTER RESIN COMPOSITION AND SHEET-FORM MOLDING MATERIAL USING THE SAME

This is a continuation-in-part of application Ser. No. 07/918,289 filed on Jul. 22, 1992, now abandoned.

BACKGROUND OF THE INVENTION

1. Field of the Invention

This invention relates to an unsaturated polyester resin composition, more particularly an unsaturated polyester resin composition capable of providing a cured product having a superior surface quality and a sheet-form molding material using the same for producing a fiber-reinforced plastic molded product.

2. Description of the Related Art

Unsaturated polyester resins are accompanied with 5 to 10% volume shrinkage when they are cured. Thus, usually the so-called low shrinking agent-blended unsaturated polyester resins, obtained by blending a thermoplastic resin such as polystyrene, polyvinyl acetate, polymethyl methacrylate, or block copolymers of conjugated dienes as a low shrinking agent with aromatic vinyl compounds, saturated polyesters, etc. have been used. Such low shrinking agent-blended unsaturated polyester resins have a very small shrinkage factor of cured volume, so that the occurrence of cracks, deformation, etc. accompanying the curing shrinkage are minimal.

When the low shrinking agent-blended unsaturated polyester resins represented by sheet-molding compound (SMC) and bulk molding compound (BMC) are used as a molding material, it is possible to improve the dimensional accuracy and the surface quality of molded products; hence the resins have been used not only for parts of housing facilities such as a bath, water tank panel, toilet bowl, etc., but also for parts of automobiles such as a spoiler, air intake, roof, engine hood, deck lid, etc.

The effectiveness of the low shrinking agent varies depending upon the type and blended quantity of the low shrinking agent. As a low shrinking agent for unsaturated polyester resin molding material, polyvinyl acetate, saturated polyester resins, conjugated diene compounds, etc. have been used in the aspect of the surface quality of molded products.

However, when polyvinyl acetate or conjugated diene compounds are used as a low shrinking agent, the viscosity of the resulting unsaturated polyester resin composition increases and, the rate for impregnating fiber reinforcing materials with the resin composition is reduced so that the surface quality of the molded products is inferior. Further, when saturated polyester resins are used as a low shrinking agent, the viscosity of the resulting resin composition is low and the rate for impregnating fiber reinforcing materials with the resin composition is superior, but in the thickened material obtained by reacting the resin composition with an alkaline earth metal oxide or hydroxide, the saturated polyester resins are separated off from the resin composition, so that the low shrinking effect is insufficient and the surface quality of the resulting molded products is notably inferior. As countermeasures for solving such problems, a process of using a saturated polyester resin having a low molecular weight (Japanese patent application laid-open No. Sho 59-122514), a process of reacting an unsaturated polyester resin with a saturated polyester resin at a high temperature (120° to 180° C.) (Japanese patent application laid-open No. Sho 63-43948), etc. have been proposed, but the resulting low shrinking effect is insufficient.

SUMMARY OF THE INVENTION

The object of the present invention is to provide an unsaturated-polyester resin composition having solved the problems of the prior art and capable of affording a molded product having a small shrinkage factor of cured volume, a superior dimensional accuracy and surface quality and a high hardness, a sheet-form molding material using the composition, and further, a process for producing a fiber-reinforced plastic molded product using the composition.

The present inventors have made extensive research in view of the above problems, and as a result, have found that when a specified saturated polyester having a number average molecular weight and an acid value each being in a specified range is used, it is possible to obtain an unsaturated polyester resin molded product having a superior surface quality.

The present invention resides in;

(1) an unsaturated polyester resin composition comprising a saturated polyester obtained by reacting a saturated dibasic acid component containing 20% by mol or more adipic acid with a saturated glycol component, and having a number average molecular weight of 4,000 or more and an acid value of 2 to 8 KOH mg/g, an unsaturated polyester and an ethylenic unsaturated monomer;

(2) a sheet-form molding material having the unsaturated polyester resin composition together with a fiber reinforcing material placed between two films; and (3) use of the sheet-form molding material in a fiber-reinforced plastic molded product, which is obtained by compression-molding of the sheet-form molding material by means of a mold.

BRIEF DESCRIPTION OF THE ACCOMPANYING DRAWING

FIG. 1 shows a view illustrating an embodiment of the apparatus for producing the sheet-form molding material of the present invention.

DETAILED DESCRIPTION OF PREFERRED EMBODIMENTS

Figure 1:
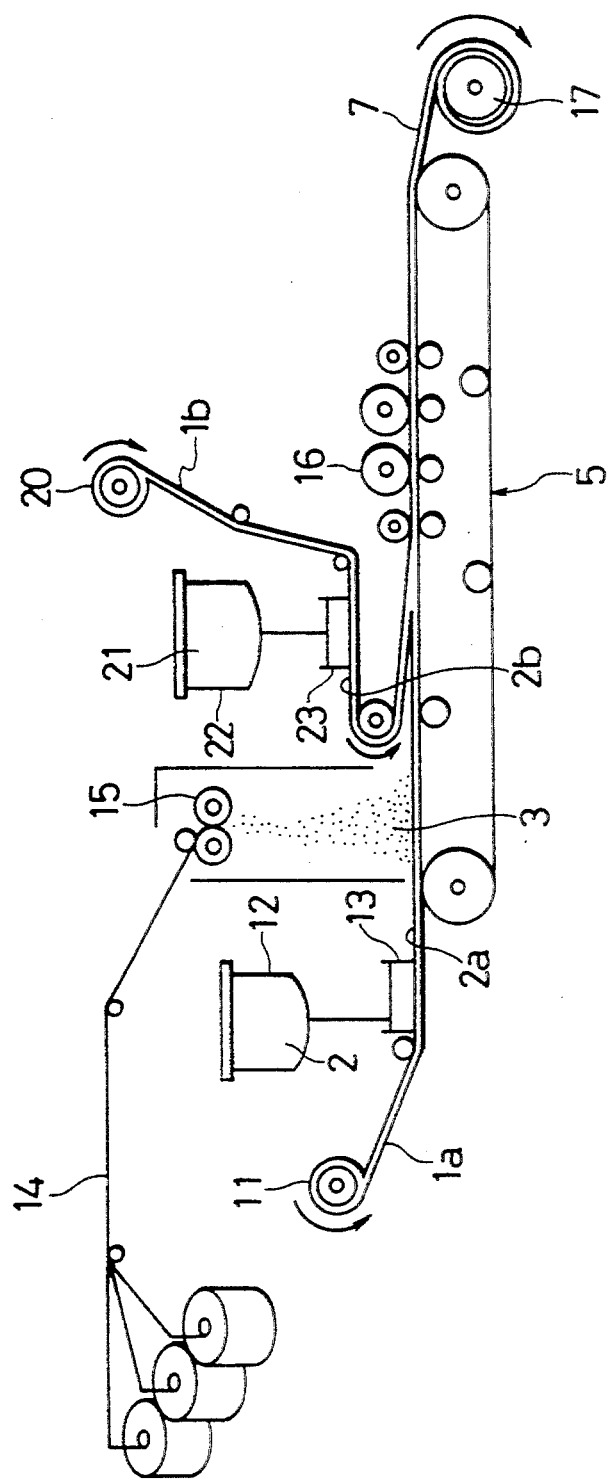

A saturated polyester used in the present invention has a number average molecular weight of 4,000 or more, preferably 4,000 to 30,000 and an acid value of 2 to 8 KOH mg/g, preferably 3 to 7 KOH mg/g. If the number average molecular weight is less than 4,000, a sufficient low shrinking effect cannot be obtained. The number average molecular weight can be adjusted by a reaction time. Further, if the acid value is less than 2 KOH mg/g, the saturated polyester separates during thickening of the unsaturated polyester resin molding material and the low shrinking effect is inferior, while if the acid value exceeds 8 KOH mg/g, the thickening rate becomes high and the rate of impregnating fiber reinforcing materials with the resin composition is reduced; hence the surface quality of the molded product is inferior.

The saturated polyester is obtained by reacting a saturated dibasic acid component with a saturated glycol component according to a known process.

As the saturated dibasic acid component, adipic acid, suberic acid, azelaic acid, sebacic acid, succinic anhydride, dimethyl succinate, maleic acid, phthalic anhydride, phthalic acid, isophthalic acid, tetrahydrophthalic acid, tetrahydrophthalic anhydride, halogenated phthalic anhydride, etc. are exemplified, but, in the present invention, it is necessary that the saturated dibasic acid component contain 20% by mol or more, preferably 50% by mol or more of adipic acid. The content of adipic acid may be 100% by mol.

As the saturated glycol component, ethylene glycol, diethylene glycol, triethylene glycol, tetraethylene glycol, 1,2-propylene glycol, 1,3-propylene glycol, dipropylene glycol, tripropylene glycol, polyoxyethylene glycol, 1,2-butanediol, 1,4-butanediol, 2,3-butanediol, 2,4-pentanediol, 2,2-dimethyltrimethylene glycol, 1,4-hexanediol, 1,5-hexanediol, 1,6-hexanediol, 2,5-hexanediol, 1,10-decanediol, 1,12-dodecanediol, tetraethylene glycol, tripropylene glycol, etc. are exemplified.

In order to impart a superior hardness to a resulting fiber-reinforced plastic molded product, it is preferred to use as the saturated glycol component, a saturated glycol component including a saturated glycol expressed by the formula (I)

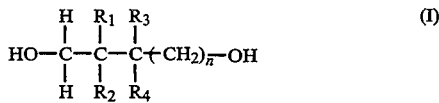

Wherein n represents an integer of 0 to 9, and wherein $R_1$, $R_2$, $R_3$ and $R_4$ each represent a hydrogen atom or an alkyl group of 1 to 4 carbon atoms and at least one of $R_1$ to $R_4$ is an alkyl group.

As the saturated glycol expressed by the formula (I), for example, 2-ethyl-1,3-hexanediol, 2,2,4-trimethyl-1,3-pentanediol, 3-methyl-1,5-pentanediol, 2,2-dimethyl-1,3-propanediol, 1,3-butanediol, etc. are used. The content of the saturated glycol is preferably in the range of 0.5 to 50% by mol based upon the total saturated glycol component.

As to the preparation of the saturated polyester, 1.0 to 2.0 mols of the saturated glycol component is reacted with one mol of the saturated dibasic acid component, and in the preparation, a catalyst such as titanium tetrabutoxide, di-n-butyl-tin oxide, zinc oxide, antimony trioxide, etc. may be also used. Further, a stabilizer such as hydroquinone, hydroquinone monomethyl ether, triphenyl phosphite, etc, may be also used. The reaction may be carried out while removing the condensed water generated during the esterification reaction, and finally the reaction temperature may be elevated up to 180° to 280° C. The reaction time is properly selected depending upon the scale of a batch, the catalyst and the reaction conditions.

The acid value of the saturated polyester may be adjusted by adding the above saturated dibasic acid component to the terminal of the saturated polyester resin after completion of the preparation.

The unsaturated polyester used in the present invention is obtained by subjecting the unsaturated dibasic acid component and, if necessary, a polybasic acid other than the unsaturated dibasic acid and a glycol component to condensation reaction.

As the unsaturated dibasic acid component, maleic anhydride, fumaric acid, chloromaleic acid, itaconic acid, citraconic acid, mesaconic acid, etc. may be used, and as the polybasic acid other than the unsaturated dibasic acid used if necessary, adipic acid, suberic acid, azelaic acid, sebacic acid, succinic anhydride, dimethyl-succinic acid, maleic acid, phthalic anhydride, phthalic acid, isophthalic acid, tetrahydrophthalic acid, tetraphthalic anhydride, halogenated phthalic anhydride, trimellitic acid, pyromellitic acid, etc. are exemplified.

As the glycol component, ethylene glycol, diethylene glycol, triethylene glycol, tetraethylene glycol, 1,2-propylene glycol, 1,3-propylene glycol, dipropylene glycol, tripropylene glycol, polyoxyethylene glycol, polyoxypropylene glycol, 1,2-butanediol, 1,3-butanediol, 1,4-butanediol, 2,3-butanediol, 2,4-pentanediol, 2,2-dimethyltrimethylene glycol, 1,4-hexanediol, 1,5-hexanediol, 1,6-hexanediol, 2,5-hexanediol, 3-methyl-1,5-pentanediol, 2-ethyl-1,3-hexanediol, 2,2,4-trimethyl-1,3-pentanediol, 1,10-decanediol, 1,12-dodecanediol, 2,2-dimethyl-1,3-propanediol, etc. are exemplified.

The quantity of the unsaturated polyester used is preferably 1.5 to 5 times the weight of the saturated polyester.

The ethylenic unsaturated monomer used in the present invention has no particular limitation, and for example, styrene, vinyltoluene, α-methylstyrene, diallylphthalate, cholorstyrene, vinylacetate, acrylic acid esters, methacrylic acid esters, etc. are exemplified. The quantity of the ethylenic unsaturated monomer used is preferably 30 to 200% by weight based upon the total quantity of the saturated polyester and the unsaturated polyester.

In the unsaturated polyester resin composition of the present invention, a filler, a polymerization initiator and if necessary, a release agent are usually used.

As the filler, calcium carbonate, clay, aluminum hydroxide, talc, calcium sulfate, etc. are exemplified. Among them, calcium carbonate is preferred in the aspect of cost and capability of filling.

As the polymerization initiator, organic peroxides such as 1,1-bis(t-butylperoxy)-3,3,5-trimethylcyclohexane, 1,1-bis(t-butylperoxy)cyclohexane, t-butylperoxy-3,3,5-trimethylhexanoate, t-butylperoxyisopropyl carbonate, 2,5-dimethyl-2,5-di(benzoylperoxy)hexane, t-butylperoxy benzoate, dicumylperoxide, 2,5-dimethyl-2,5-di(t-butyl peroxy)hexane, t-butylperoxy(2-ethylhexanoate), di-t-butyl hydroperoxide, t-butylperoctoate, benzoylperoxide, etc. are used. In order to obtain a superior surface quality in a usual molding time, t-butylperoxybenzoate alone or in an admixture with another compound is preferably used.

As the release agent, fatty acids such as stearic acid, milistic acid, palmitic acid, etc., metal salts of fatty acids such as calcium stearate, zinc stearate, etc., and surface-active agents such as phosphoric acid esters, etc. may be used.

The quantity of the filler used is usually 1.0 to 3.5 times the total quantity of the unsaturated polyester resin composition. The quantities of the polymerization initiator and the release agent each have no particular limitation, and they are used in a usual quantity.

Further, a thickener, a pigment, a curing accelerator, a curing retarder, a viscosity-lowering agent, etc. may be blended in the unsaturated polyester resin composition of the present invention, if necessary.

FIG. 1 shows a view illustrating an embodiment of an apparatus for producing the sheet-form molding material of the present invention.

This apparatus comprises a belt conveyer system 5 for carrying and processing films 1a and 1b, a pressure roll 16 provided on the belt conveyer system 5, for laminating and contact-bonding films 1a and 1b rolls 11 and 20 each for feeding the films 1a and 1b to the belt conveyer system 5, tanks 12 and 22 each for storing unsaturated polyester resins 2 and 21, doctor knives 13, 23 each for adjusting the thickness of the respective composition layers on the films, a cutter 15 for cutting a roving 14 of fibers to a definite length, provided above the belt conveyer system 5 so that the resulting chopped strands are scattered on the composition layer, and a wind-up roll 17 for winding up the resulting contact-bonded sheet 7.

In this apparatus, films 1a and 1b are respectively released from rolls 11 and 20; the respective unsaturated polyester resin compositions 2 and 21 fed from the respective tanks 12 and 22 are applied onto the respective films 1a and 1b to form the respective unsaturated polyester resin composition layers 2a and 2b so that the respective applied quantities are adjusted by means of the respective doctor knives 13 and 23; chopped strands (fiber reinforcing material) 3 obtained by cutting roving 14 to a definite length by means of cutter 15 are laid in a definite quantity onto the composition layer 2a; thereafter, the resulting material is laminated with another composition layer 2b so as to place the fiber reinforcing material 3 between the two composition layers; the resulting laminate is contact-bonded by means of the pressure rolls 16, wound up on the wind-up roll 17, and seasoned for a definite period to obtain a sheet-form molding material.

The resulting sheet-form molding material is cured, e.g., by heat-compressing it under a pressure of 50 to 120 kgf/cm$^2$ at a temperature of 110° C. in a mold, whereby it is possible-to obtain a fiber-reinforced plastic molded product having a superior surface quality.

As the fiber reinforcing material 3, e.g. inorganic fibers such as glass fibers, carbon fibers, boron fibers, etc., or organic fibers such as polyvinyl alcohol fibers, nylon fibers, aramid fibers, etc. may be used. The fiber reinforcing material may be blended, usually in a proportion of about 10 to 50% by weight, based upon the total weight of the composition.

As the films 1a and 1b used for producing the sheet-form molding material, general films such as polyethylene film, polypropylene film, polyethlene terephthalate film, etc. may be used.

The present invention will be described in more detail by way of Examples and Comparative examples, but it should not be construed to be limited thereto.

(1) Preparation of saturated polyester (A):

Into a 500 ml preparation flask provided with a stirrer, a thermometer, a nitrogen gas-introducing tube and a Viglew fractionating tube, were fed adipic acid (200.02 g, 1.37 mol), ethylene glycol (55.21 g, 0.89 mol), 1,4-butylene glycol (49.32 g, 0.548 mol), hydroquinone (0.03 g) and triphenyl phosphite (0.3 g), followed by elevating the temperature inside the flask up to 215° C. over about 8 hours, while distilling off the condensed water at a temperature of 105° C. or lower at the top of the fractionating tube, thereafter carrying out the reaction for about 4 hours, while keeping the reaction temperature of 215° C., then removing the fractionating tube, and carrying out the reaction under a reduced pressure of $5.1 \times 10^4$ Pa for about 10 hours to obtain a saturated polyester (A) (234.1 g) having an acid value of 4 KOH mg/g. The molecular weight of the saturated polyester was determined using a gel permeation chromatography and converted as a standard polystyrene (the molecular weights of saturated polyesters (B)-(L) were also determined in this manner), to give a number average molecular weight of 14,100 and a weight average molecular weight of 29,200.

(2) Preparation of saturated polyester (B):

Into a 500 ml preparation flask provided with a stirrer, a thermometer, a nitrogen gas-introducing tube and a McMahon packing type fractionating tube, were fed adipic acid (189.8 g, 1.3 mol), ethylene glycol (64.48 g, 1.04 mol), 1,4-butylene glycol (46.8 g, 0.52 mol), zinc oxide (0.3 g) and triphenyl phosphite (0.3 g), followed by elevating the temperature inside the flask up to 250° C. over about 5 hours, while distilling off the condensed water at a temperature of 105° C. or lower at the top of the fractionating tube, thereafter carrying out the reaction for about 5 hours, while keeping the reaction temperature of 250° C., then removing the fractionating tube, carrying out the reaction for about 7 hours under a reduced pressure of $2.5 \times 10^2$ Pa to obtain a pale yellow resin, adding phthalic anhydride (1.95 g) to the pale yellow resin and agitating the mixture at 160° C. until the phthalic anhydride was dissolved, to obtain a saturated polyester (B) (225.2 g) having an acid value of 4.9 KOH mg/g, a number average molecular weight of 13,500 and a weight average molecular weight of 26,700.

(3) Preparation of saturated polyester (C):

The above item (2) was repeated except that adipic acid (189.8 g, 1.3 mol), ethylene glycol (72.54 g, 1.17 mol), propylene glycol (19.76 g, 0.26 mol), 2-ethyl-1,3-hexanediol (18.98 g, 0.13 mol), zinc oxide (0.3 g) and triphenyl phosphite (0.3 g) were fed and phthalic anhydride was not added, to obtain a saturated polyester (C) (226.2 g) having an acid value of 3.8 KOH mg/g, a number average molecular weight of 12,400 and a weight average molecular weight of 24,800.

(4) Preparation saturated polyester (D):

Into the same preparation apparatus as in item (2) were fed adipic acid (189.8 g, 1.3 mol), ethylene glycol (72.54 g, 1.17 mol), propylene glycol (19.76 g, 0.26 mol), 2,2,2-trimethyl-1,3-pentanediol (18.98 g, 0.13 mol), di-n-butyltin oxide (0.3 g) and triphenyl phosphite (0.3 g), followed by elevating the temperature inside the flask up to 250° C. over about 5 hours, while distilling off the condensed water at a temperature of 105° C. or lower at the top of the fractionating tube, thereafter carrying out the reaction for 6 hours, while keeping the reaction temperature of 250° C., then removing the fractionating tube, carrying out the reaction for 4 hours under a reduced pressure of $2.5 \times 10^2$ Pa to obtain a pale yellow resin, adding phthalic anhydride (1.92 g) to the pale yellow resin and agitating the mixture at 160° C. until the phthalic anhydride was dissolved, to obtain a saturated polyester (D) (221.7 g) having an acid value of 5.0 KOH mg/g, a number average molecular weight of 12,300 and a weight average molecular weight of 26,500.

(5) Preparation of saturated polyester(E):

Into the same preparation flask as in item (2) were fed adipic acid (189.8 g, 1.3 mol), ethylene glycol (72.54 g, 1.17 mol), propylene glycol (19.76 g, 0.26 mol), 2-ethyl-1,3-hexanediol (9.49 g, 0.065 mol), 2,2,4-trimethyl-1,3-pentanediol (9.49 g, 0.065 mol), zinc oxide (0.3 g) and triphenyl phosphite (0.3 g), followed by elevating the temperature inside the flask up to 250° C. over about 4 hours, while distilling off the condensed water at a temperature of 105° C. or lower at the top of the fractionating tube, thereafter carrying out the reaction for about 7 hours, while keeping the reaction temperature at 250° C., removing the fractionating tube, carrying out the reaction for about 6 hours under a reduced pressure of 8.0×10 Pa to obtain a pale yellow resin, adding phthalic anhydride (1.89 g) to the pale yellow resin, and agitating the mixture at 160° C. until the phthalic anhydride was dissolved, to obtain a saturated polyester (E) (225.4 g) having an acid value of 4.1 KOH mg/g, a number average molecular weight of 10,200 and a weight average molecular weight of 21,400.

(6) Preparation of saturated polyester (F):

The above item (2) was repeated except that adipic acid (122.64 g, 0.84 mol), sebacic acid (84,84 g, 0.42 mol), ethylene glycol (49.48 g, 0.798 mol), propylene glycol (41.50 g, 0.546 mol), 2-ethyl-1,3-hexanediol (12.26 g, 0.084 mol), zinc oxide (0.3 g) and triphenyl phosphite (0.3 g), to obtain a saturated polyester (F) (221.7 g) having an acid value of 4.5 KOH mg/g, a number average molecular weight of 8,500 and a weight average molecular weight of 18,700.

The compositions of the saturated polyesters (A) to (F) prepared above and the resin properties thereof are shown in Table 1.

polyester (Polyset, tradename of product made by Hitachi Chemical Company) (35 parts by weight), styrene (50 parts by weight), a filler (CaCO$_3$, slite 1200, tradename of product made by Nitto Funka Kogyo K.K.) (200 parts by weight), a polymerization initiator (t-butylperoxy-benzoate (1.5 parts by weight) and a release agent (zinc stearate) (2.5 parts by weight), to prepare unsaturated resin compositions A to L.

With the respective compositions A to L was blended MgO as a thickener in a quantity of 1.2% by weight based upon the weight of the respective unsaturated polyesters, followed by agitating and feeding the resulting respective materials to an apparatus for producing a sheet-form molding material shown in FIG. 1, to obtain sheet-form molding materials containing glass fibers of 25% by weight.

The resulting sheet-form molding materials were cut to a definite size and compression-molded by means of a mold heated to 150° C. under a molding pressure of 100 kgf/cm$^2$, to obtain fiber-reinforced plastic molded products.

The respective surface qualities of the resulting flat sheet molded products were evaluated with the area of

TABLE 1

| Kind of saturated polyesters | | (A) | (B) | (C) | (D) | (E) | (F) |
| --- | --- | --- | --- | --- | --- | --- | --- |
| Properties of components fed (mol) | Adipic acid | 1.0 | 1.0 | 1.0 | 1.0 | 1.0 | 1.0 |
| | Sebacic acid | — | — | — | — | — | 0.5 |
| | 1,4-Butylene glycol | 0.4 | 0.4 | — | — | — | — |
| | Ethylene glycol | 0.65 | 0.8 | 0.9 | 0.9 | 0.9 | 0.95 |
| | Propylene glycol | — | — | 0.2 | 0.2 | 0.2 | 0.65 |
| | 2-Ethyl-1,3-hexanediol | — | — | 0.1 | — | 0.05 | 0.1 |
| | 2,2,4-Trimethyl-1,3-pentanediol | — | — | — | 0.1 | 0.05 | — |
| Properties | Acid value (KOH mg/g) | 2.4 | 4.9 | 3.8 | 5.0 | 4.1 | 4.5 |
| | Number average molecular weight | 14,100 | 13,500 | 12,400 | 12,300 | 10,200 | 8,500 |
| | Weight average molecular weight | 29,200 | 26,700 | 24,800 | 26,500 | 21,400 | 18,700 |

(7) Preparations of saturated polyester (G) to (L) to be used in Comparative examples:

Saturated polyesters (G) to (L) having resin properties shown in Table 2 were prepared in the same manner as the above, in proportions of components fed, shown in Table 2.

10×10 inch of samples of the flat sheet molded products, by means of a surface smoothness-measuring machine (Rolia, tradename of product made by Ashland Company, U.S.A.). The surface quality was evaluated with the surface smoothness (Index Number value: IN value) and distinctness of image (DOI value). The IN

TABLE 2

| Kind of saturated polyesters | | (G) | (H) | (I) | (J) | (K) | (L) |
| --- | --- | --- | --- | --- | --- | --- | --- |
| Properties of components fed (mol) | Adipic acid | 1.0 | 1.0 | 1.0 | 1.0 | 1.0 | — |
| | Sebacic acid | — | — | — | — | — | 1.0 |
| | 1,4-Butylene glycol | 0.4 | 0.4 | 0.4 | — | — | — |
| | Ethylene glycol | 0.8 | 0.8 | 0.8 | 0.9 | 0.9 | 0.9 |
| | Propylene glycol | — | — | — | 0.2 | 0.2 | 0.2 |
| | 2-Ethyl-1,3-hexanediol | — | — | — | 0.05 | 0.05 | 0.05 |
| | 2,2,4-Trimethyl-1,3-pentanediol | — | — | — | 0.05 | 0.05 | 0.05 |
| Properties | Acid value (KOH mg/g) | 2.6 | 0.8 | 8.9 | 1.4 | 8.2 | 4.6 |
| | Number average molecular weight | 2,900 | 12,000 | 16,200 | 10,000 | 9,900 | 8,400 |
| | Weight average molecular weight | 11,700 | 32,000 | 31,200 | 20,200 | 19,400 | 17,800 |

EXAMPLES 1 TO 6 AND COMPARATIVE EXAMPLES 1 TO 6

With the respective saturated polyesters (A) to (L) (each 15 parts by weight) were blended an unsaturated value shows that the smaller its numerical value, the better the surface smoothness, and the DOI value shows that the larger its value, the better the distinctness of image.

The results are shown in Table 3.

TABLE 3

| | Example 1 | Example 2 | Example 3 | Example 4 | Example 5 | Example 6 | Comp. ex. 1 | Comp. ex. 2 | Comp. ex. 3 | Comp. ex. 4 | Comp. ex. 5 | Comp. ex. 6 |
|---|---|---|---|---|---|---|---|---|---|---|---|---|
| Saturated polyester | | | | | | | | | | | | |
| Kind | (A) | (B) | (C) | (D) | (E) | (F) | (G) | (H) | (I) | (J) | (K) | (L) |
| Acid value (KOH mg/g) | 2.4 | 4.9 | 3.8 | 5.0 | 4.1 | 4.5 | 2.6 | 0.8 | 8.9 | 1.4 | 8.2 | 4.6 |
| Number average M.W. | 14,100 | 13,500 | 12,400 | 12,300 | 10,200 | 8,500 | 2,900 | 12,000 | 16,200 | 10,000 | 9,900 | 8,400 |
| Weight average M.W. | 29,200 | 26,700 | 24,800 | 26,500 | 21,400 | 18,700 | 11,700 | 32,000 | 31,200 | 20,200 | 19,400 | 17,800 |
| Evaluation of molded product | | | | | | | | | | | | |
| Surface smoothness (IN value) | 63 | 60 | 59 | 60 | 62 | 68 | 153 | 100 | 90 | 107 | 85 | 189 |
| Distinctness of image (DOI value) | 93 | 97 | 95 | 96 | 95 | 92 | 57 | 67 | 71 | 68 | 79 | 45 |

As seen from Table 3, the fiber-reinforced plastic molded products molded from the sheet-form molding materials obtained using the unsaturated polyester resin compositions A to F according to the present invention each have a small IN value and a large DOI value, that is, a superior surface smoothness and a superior distinctness of image.

(8) Preparation of saturated polyester (M-1):

Into a 500 ml preparation flask provided with a stirrer, a thermometer, a nitrogen gas-introducing tube and a McMahon packing type fractionating tube, were fed adipic acid (189.8 g, 1.3 mol), ethylene glycol (72.54 g, 1.17 mol), propylene glycol (19.76 g, 0.26 mol), 2-ethyl-1,3-hexanediol (18.98 g, 0.13 mol), zinc oxide (0.3 g) and triphenyl phosphite (0.3 g), followed by elevating the temperature inside the flask up to 250° C. over about 5 hours, while distilling off the condensed water at a temperature of 105° C. or lower at the top of the fractionating tube, thereafter carrying out the reaction for about 5 hours, while keeping the reaction temperature at 250° C. then removing the fractionating tube, and carrying out the reaction for about 7 hours under a reduced pressure of $2.5 \times 10^2$ Pa, to obtain a saturated polyester (M-1) (226.2 g) having an acid value of 3.8 KOH mg/g. The molecular weight of this saturated polyester (M1) was determined using a gel permeation chromatography and converted as a standard polystyrene, to give a number average molecular weight of 14,100 and a weight average molecular weight of 29,200.

(9) Preparation of saturated polyesters (M-2) to (M-4):

The above item (1) was repeated except that proportions of components fed shown in Table 3 were used. The acid values, the number average molecular weights and the weight average molecular weights of the resulting saturated polyesters are shown in Table 4.

TABLE 4

| Kind of saturated polyester | (M-1) | (M-2) | (M-3) | (M-4) |
|---|---|---|---|---|
| Proportion of components fed (mol) | | | | |
| Adipic acid | 1.0 | 1.0 | 1.0 | 1.0 |
| Ethylene glycol | 0.9 | 1.0 | 0.9 | 0.9 |
| Propylene glycol | 0.2 | — | — | 0.2 |
| 2-Ethyl-1,3-hexanediol | 0.1 | 0.2 | — | 0.05 |
| 2,2,4-Trimethyl-1,3-pentanediol | — | — | — | 0.05 |
| 2,2-Dimethyl-1,3-propanediol | — | — | 0.3 | — |
| Properties | | | | |

TABLE 4-continued

| Kind of saturated polyester | (M-1) | (M-2) | (M-3) | (M-4) |
|---|---|---|---|---|
| Acid value (KOH mg/g) | 3.8 | 4.5 | 3.4 | 2.6 |
| Number average M.W. | 14,100 | 8,100 | 12,600 | 2,900 |
| Weight average M.W. | 29,200 | 15,300 | 24,300 | 11,700 |

EXAMPLES 7 TO 9 AND COMPARATIVE EXAMPLE 7

Using the above obtained saturated polyesters (M-1) to (M-4), each as a low shrinking agent, and in the blending proportions shown in Table 5, the respective unsaturated polyester resin compositions were prepared. MgO as a thickener was blended with the resulting compositions so as to give 1.2 parts by weight based upon 100 parts by weight of the unsaturated polyesters, followed by agitating and feeding the mixture to the apparatus for producing a sheet-form molding material, shown in FIG. 1, to obtain sheet-form molding material containing glass fibers of 25% by weight.

The resulting sheet-form molding materials were cut to a definite size and compression-molded under a molding pressure of 100 kgf/cm², by means of a mold heated to 150° C., to obtain fiber-reinforced plastic molded products.

TABLE 5

| Blended material | Blended quantity wt. |
|---|---|
| Saturated polyesters (M-1) to (M-4) or Polyvinyl acetate | 15 parts |
| Unsaturated polyester (B) (Polyset 9120, made by Hitachi Chemical CO.) | 35 parts |
| Styrene (C) | 50 parts |
| Filler (CaCO₃, Slite 1200, tradename of product made by Nitto Funka Kogyo K.K.) | 200 parts |
| Polymerization initiator (t-butylperoxybenzoate) | 1.5 parts |
| Release agent (Zn Stearate) | 2.5 parts |

COMPARATIVE EXAMPLE 8

Example 7 was repeated except that polyvinyl acetate (Gosenyl NZ-5, trademark of product made by Nippon Gosei Kagaku Kogyo K.K. Ltd, molecular weight: 34,000) was used, to obtain a fiber-reinforced plastic molded product.

TEST EXAMPLE

The surface quality of the resulting flat sheet molded products was evaluated in the same manner as above, using a surface smoothness-measuring machine (Rolia, tradename of product made by Ashland Company, U.S.A.) and with the area of 10×10 inch of flat sheet molded products as sample.

Further, the hardness was measured using a hardness meter (Barcol hardness meter, tradename of product made by Rockford Company), according to JIS K 6911. The results are shown in Table 6.

TABLE 6

|  |  | Example 7 | Example 8 | Example 9 | Comp. ex. 7 | Comp. ex. 8 |
| --- | --- | --- | --- | --- | --- | --- |
| Low shrinkage agent | Saturated polyester (M) | (M-1) | (M-2) | (M-3) | (M-4) | Polyvinyl acetate |
|  | Number average M.W. | 14,100 | 8,100 | 12,600 | 2,900 | — |
|  | weight average M.W. | 29,20 | 15,300 | 24,300 | 11,700 | — |
| Evaluation of molded product | Surface smoothness (IN value) | 59 | 62 | 61 | 147 | 85 |
|  | Distinctness of image (DOI value) | 95 | 94 | 94 | 58 | 79 |
|  | Hardness (Barcol hardness) | 52 | 53 | 50 | 50 | 50 |

As seen from Table 6, in Example 7 to 9 containing saturated polyesters (M-1) to (M-3), IN value is small, and DOI value is large, that is, the surface smoothness and the distinctness of image are superior.

According to the unsaturated resin composition of the present invention, the curing shrinkage factor at the time of curing is so small that it is possible to obtain a fiber-reinforced plastic molded product having a superior surface quality and hardness by using the sheet-form molding material obtained by using the composition.

EXAMPLE 10 AND COMPARATIVE EXAMPLE 9

A saturated polyester (A) (15 parts by weight) in Table 1 is blended with an unsaturated polyester (Polyset, tradename of product made by Hitachi Chemical Company) (35 parts by weight), styrene (50 parts by weight), a filler ($CaCO_3$, slite 1200, tradename of product made by Nitto Funka Kogyo K.K.) 200 parts by weight, a polymerization initiator (t-butyl-peroxybenzoate) 1.5 parts by weight) and a release agent (zinc stearate) (2.5 parts by weight) at room temperature for 15 minutes, to prepare an unsaturated polyester resin composition M (Example 10).

Another unsaturated polyester resin composition N (Comparative example 9) was prepared in the same manner as the above except that blending was carried out at 150° C. for 15 minutes and styrene was not added. Styrene (50 parts by weight) was blended with the resulting composition after cooling it down to 60° C.

With the respective compositions M (Example 10) and N (Comparative example 9), fiber-reinforced plastic products thereof were prepared and the surface smoothness (IN value) and distinctness of image (DOI value) thereof were measured in the same manner as Example 1.

The results are shown in Table 7.

TABLE 7

| Items |  | Composition M (Example 10) | Composition N (Comp. ex. 9) |
| --- | --- | --- | --- |
| Blending conditions (°C./min) |  | RT/15 | 150/15 |
| Molecular weight (Mn) | Unsaturated polyester resin * | 1,900 | |
|  | Saturated polyester resin ** | 14,100 | |
| Surface smoothness (IN value) |  | 63 | 380 |
| Distinctness of image (DOI value) |  | 93 | 30 |

\* Polyset 9120
\*\* Saturated polyester (A) in Table 1

The unsaturated polyester resin composition M which was prepared at room temperature is superior in both surface smoothness and distinctness of images defined in the specification as compared with the unsaturated polyester resin composition N which was prepared in presence of heat.

REFERENCE EXAMPLE 1

Into a 2 little four-necked flask provided with a stirrer, a condenser, a $N_2$ gas introducing tube and a thermometer, adipic acid (585 g) and propylene glycol (320 g) (molar ratio 1:1.05) are fed, followed by adding dibutyltin oxide (0.05% by weight of the reaction system), reacting at 210° C. for about 10 hours to obtain a saturated polyester P-1. A portion of the resulting polyester was further reacted at 210° C. to obtain a saturated polyester P-2. Further, a portion of the resulting polyester was further reacted at 210° C. to obtain a saturated polyester P-3.

Molecular weights and acid values of the resulting saturated polyesters were measured.

The results are shown in Table 8.

TABLE 8

| Items |  | Polyester P-1 | Polyester P-2 | Polyeste4 P-3 |
| --- | --- | --- | --- | --- |
| Components of saturated polyester |  | Adipic acid/Propylene glycol (1/1.05) | | |
| Molecular weight | Mn | 2,020 | 2,300 | 2,800 |
|  | Mw | 3,900 | 4,600 | 6,150 |
| Acid value (KOH mg/g) |  | 32 | 17 | 15 |

As shown in Table 8, the acid values are between 15 to 32 KOH mg/g which values are far greater than 2 to 8 KOH mg/g of the present invention.

REFERENCE EXAMPLE 2

According to the process described in U.S. Pat. No. 5,075,393, column 7, line 59 to column 8, line 17, and Table 1 (Example A), various saturated polyester compositions were prepared by varying the reaction temperature and the reaction time.

The results are shown in Table 9.

TABLE 9

| | | Polyester K-1 | Polyester K-2 | Polyester K-3 | Polyester K-4 | Polyester K-5 |
|---|---|---|---|---|---|---|
| Components of saturated polyester | | Telephthalic acid acid (3.0)/diethylene glycol (1.0)/1,6-hexane diol (2.0) | | | | |
| Molecular | Mn | 5,800 | 6,300 | 8,700 | 8,200 | 7,600 |
| Weight | Mw | 9,800 | 12,100 | 20,200 | 19,900 | 17,800 |
| | Mw/Mn | 1.69 | 1.92 | 2.32 | 2.43 | 2.34 |
| Acid value (KOH mg/g) | | 22 | 11 | could not be determined | | |
| Styrene Solubility Test | | Pass | Pass | | Fail | |

As shown in Table 9, it is impossible to obtain a composition containing a saturated polyester having a molecular weight (Mn) of 10,000 or more by this process, since the resulting polyester becomes insoluble in styrene as the molecular weight thereof increases (K-3–K-5), while the molecular weight decreases as the decomposition thereof proceeds (K-3→K-4→K-5).

EXAMPLE 11 AND COMPARATIVE EXAMPLE 10

Example 3 and Example 6 are repeated and properties of the molded products were measured. These properties includes the following orange peel and shrinkage of a molded product (%).

Orange peel: This value was measured by means of a surface smoothness-measuring machine (Rolia, tradename of product made by Ashland Company, U.S.A.). The greater this value, the less the orange peel.

Shrinkage of molded product: This value was determined by the following equation.

$$S = 100 (L_o - L)/L_o$$

S: Shrinkage of a molded product (%)
$L_o$: size of a metal mold at 23° C.
L: size of a molded product at 23° C.

The results are shown in the following Table 10.

The product (Example 11) using adipic acid as a sole component of a saturated polyester is superior in properties of orange peel and shrinkage of a molded product to the product (Comparative example 10) using adipic acid and sebacic acid as components of a saturated polyester.

What we claim is:

1. An unsaturated polyester resin composition, comprising:
   (a) a saturated polyester obtained by reacting 100% by mol of adipic acid with a saturated glycol component, said saturated polyester having a number average molecular weight of 4,000 or more and an acid value of 2 to 8 KOH mg/g;
   (b) an unsaturated polyester and
   (c) an ethylenic unsaturated monomer, said saturated polyester, said unsaturated polyester and said ethylenic unsaturated monomer blended, at room temperature, to form said unsaturated polyester resin composition.

2. An unsaturated polyester resin composition according to claim 1, wherein said saturated glycol component is a glycol expressed by the formula (I)

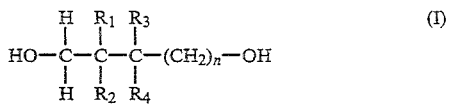

wherein n represents an integer of 0 to 9, and wherein R1, R2, R3 and R4 each represent a hydrogen atom or an alkyl group of 1 to 4 carbon atoms and at least one of $R_1$ to $R_4$ is an alkyl group.

3. An unsaturated polyester resin composition according to claim 1, wherein said saturated glycol com-

TABLE 10

| | | Example 11 | Comp. ex. 10 |
|---|---|---|---|
| Components of a saturated polyester (mol) | | Adipic acid: 1.0<br>Ethylene glycol: 0.9<br>Propylene glycol: 0.2<br>2-ethyl-1, 3-hexane diol: 0.1 | Adipic acid: 1.0<br>Sebacid acid: 0.5<br>Ethylene glycol: 0.95<br>Propylene glycol: 0.65<br>2-ethyl-1,3-hexane diol: 0.1 |
| Acid value (KOH mg/g) | | 3.8 | 4.6 |
| Molecular weight (Mn) | | 12,400 | 8,300 |
| Molecular weight (Mw) | | 24,800 | 18,300 |
| Properties of Molded Product | Surface smoothness (IN value) | 59 | 68 |
| | Distinctness image (DOI value) | 95 | 92 |
| | Orange peel | 9.5 | 8.1 |
| | Shrinkage of a molded product | −0.065 | −0.041 | ponent is selected from the group consisting of ethylene glycol, diethylene glycol, triethylene glycol, tetraethylene glycol, 1,2-propylene glycol, 1,3-propylene glycol, dipropylene glycol, tripropylene glycol, polyoxyethylene glycol, 1,2-butanediol, 1,4-butanediol, 2,3-butanediol, 2,4-pentanediol, 2,2-dimethyltrimethylene glycol, 1,4-hexanediol, 1,5-hexanediol, 1,6-hexanediol, 2,5-hexanediol, 1,10-decanediol, 1,12-dodecanediol, tetraethylene glycol and tripropylene glycol.

4. An unsaturated polyester resin composition according to claim 1, wherein said unsaturated polyester is obtained by subjecting an unsaturated dibasic acid component and a glycol component to condensation reaction, said unsaturated dibasic acid component being selected from the group consisting of maleic anhydride, fumaric acid, chloromaleic acid, itaconic acid, citraconic acid and mesaconic acid, and said glycol component being selected from the group consisting of ethylene glycol, diethylene glycol, triethylene glycol, tetraethylene glycol, 1,2-propylene glycol, 1,3-propylene glycol, dipropylene glycol, tripropylene glycol, polyoxyethylene glycol, polyoxypropylene glycol, 1,2-butanediol, 1,3-butanediol, 1,4-butanediol, 2,3-butanediol, 2,4-pentanediol, 2,2-dimethyltrimethylene glycol, 1,4-hexanediol, 1,5-hexanediol, 1,6-hexanediol, 2,5-hexanediol, 3-methyl-1,5-pentanediol, 2-ethyl-1,3-hexanediol, 2,2,4-trimethyl-1,3-pentanediol, 1,10-decanediol, 1,12-dodecanediol and 2,2-dimethyl-1,3-propanediol.

5. An unsaturated polyester resin composition according to claim 1, wherein the quantity of said unsaturated polyester is in the range of 1.5 to 5 times the weight of said saturated polyester.

6. An unsaturated polyester resin composition according to claim 1, wherein the ethylenic unsaturated monomer is selected from the group consisting of styrene, vinyltoluene, α-methylstyrene, diallylphthalate, chlorostyrene, vinylacetate, acrylic acid esters and methacrylic acid esters, and the quantity of the ethylenic unsaturated monomer is in the range of 30 to 200% by weight based upon the total quantity of the saturated polyester and the unsaturated polyester.

* * * * *